United States Patent [19]

Goodell

[11] 4,299,694
[45] Nov. 10, 1981

[54] METHOD AND APPARATUS FOR CHAR SEPARATION FROM THE DISCHARGE MATERIALS OF AN IRON OXIDE REDUCING KILN

[75] Inventor: Thomas W. Goodell, Harriman, Tenn.

[73] Assignee: The Direct Reduction Corporation, New York, N.Y.

[21] Appl. No.: 180,941

[22] Filed: Aug. 25, 1980

[51] Int. Cl.³ .............................................. B07B 4/02
[52] U.S. Cl. .................................. 209/139 R; 209/12; 209/146; 209/154
[58] Field of Search ........................... 209/136–139 R, 209/14 C, 141, 146, 154, 12

[56] References Cited

U.S. PATENT DOCUMENTS

| | | | |
|---|---|---|---|
| 3,265,210 | 8/1966 | Harte et al. | 209/154 X |
| 3,378,140 | 4/1968 | Wochnowski et al. | 209/137 |
| 3,655,043 | 4/1972 | Wochnowski et al. | 209/154 X |
| 3,975,263 | 8/1976 | Elo | 209/154 X |
| 4,010,097 | 3/1977 | Murray et al. | 209/139 R |

Primary Examiner—William A. Cuchlinski, Jr.

Attorney, Agent, or Firm—Cooper, Dunham, Clark, Griffin & Moran

[57] ABSTRACT

A classifying system including an air elutriation device is disclosed, which device is in the form of an upright box defining an airflow chamber open at its lower end and connected at its upper end to an exhauster device. A mixture of particulate materials is admitted into the chamber through a slot in the side of the box above a series of rods which extend across the chamber and are adjustable for varying the rate and turbulence of the airflow in the admitting zone to separate the lighter particles from the heavier particles in the mixture with the lighter particles being carried by the airflow upwardly and out of the chamber. The heavier particles fall downwardly through the chamber into a collecting hopper disposed beneath the open lower end of the box and having its upper open end appropriately dimensioned such that the velocity of the ingress of air into the chamber will result in the air stream velocity in the admitting zone above the bars not exceeding the separation velocity for the materials introduced through the feed slot. Additional separation and classifying components may also be included in the system.

11 Claims, 3 Drawing Figures

METHOD AND APPARATUS FOR CHAR SEPARATION FROM THE DISCHARGE MATERIALS OF AN IRON OXIDE REDUCING KILN

BACKGROUND OF THE INVENTION

The present invention relates to the particle separating or elutriation art, and more particularly to a method and means for separating fine char from the discharge waste in the process for directly reducing iron oxides in a rotary kiln using a solid carbonaceous reducing agent as both fuel and reductant.

The discharge materials from rotary kilns, wherein materials containing iron oxides and other oxides are directly reduced using solid carbonaceous material such as coal as the fuel and reductant, are conventionally subjected, after screening, to magnetic separation whereby the sponge iron or metal product is magnetically attracted and withdrawn from the materials and the nonmagnetic portion of the materials comprising charred coal and fine matter are passed along and separated. The larger pieces of charred coal or char are recycled back to the kiln, and the fine char is included with the ultimate process waste. The fine char passing to waste can amount to a considerable loss for the process, as additional coal must be fed in time to the kiln in proportion to the char dropped out of the process in the waste. Particularly with recent improvements in the performance of this type of direct reduction process such as disclosed in co-pending application Ser. No. 132,806, the loss of the fine char takes on greater importance as it can now be efficiently recycled by feeding it with or without the coal through the discharge end of the kiln.

To improve the efficiency of this type of process and related processes, the present invention may be used in the product separation system to recover lighter particles, such as the fine char, from heavier waste particles, providing a larger percentage of char recovery and recycling and thus a reduction in the amount of fresh coal required in the process.

SUMMARY OF THE INVENTION

In accordance with the present invention, a system with an air elutriation device is provided which is particularly suitable for use in classifying and separating the constituents in the output materials from coal fired processes that contain partially burned or charred particles of coal. The device comprises a housing containing a chamber into which the discharge materials are evenly metered from a hopper/spreader and subjected to a countercurrent air-flow stream produced by an exhauster operatively connected to the upper end of the chamber. The lighter particles of charred coal or char are carried upwardly by the air stream, while the comparatively heavier particles of metal such as DRI, refractory bits, desulfurizing agent, and other agents fall downwardly in the chamber. The lower part of the chamber is provided with a series of transversely disposed separating rods or bars which are adjustable in relative orientation to produce a desired separation velocity and turbulence in the air stream to enhance the separating action. The lower end of the housing is open and dimensioned to admit air with an ingress velocity of about half that of the separation velocity. Additional air may be admitted to the upper part of the chamber to sweep the upwardly floating lighter or lower density particles out to a low-efficiency cyclone for collection, while the heavier particles may be dropped through the open lower end into a hopper and passed for further classification or to a magnetic separator device for further separation and processing.

DETAILED DESCRIPTION OF THE INVENTION

Figure 1:
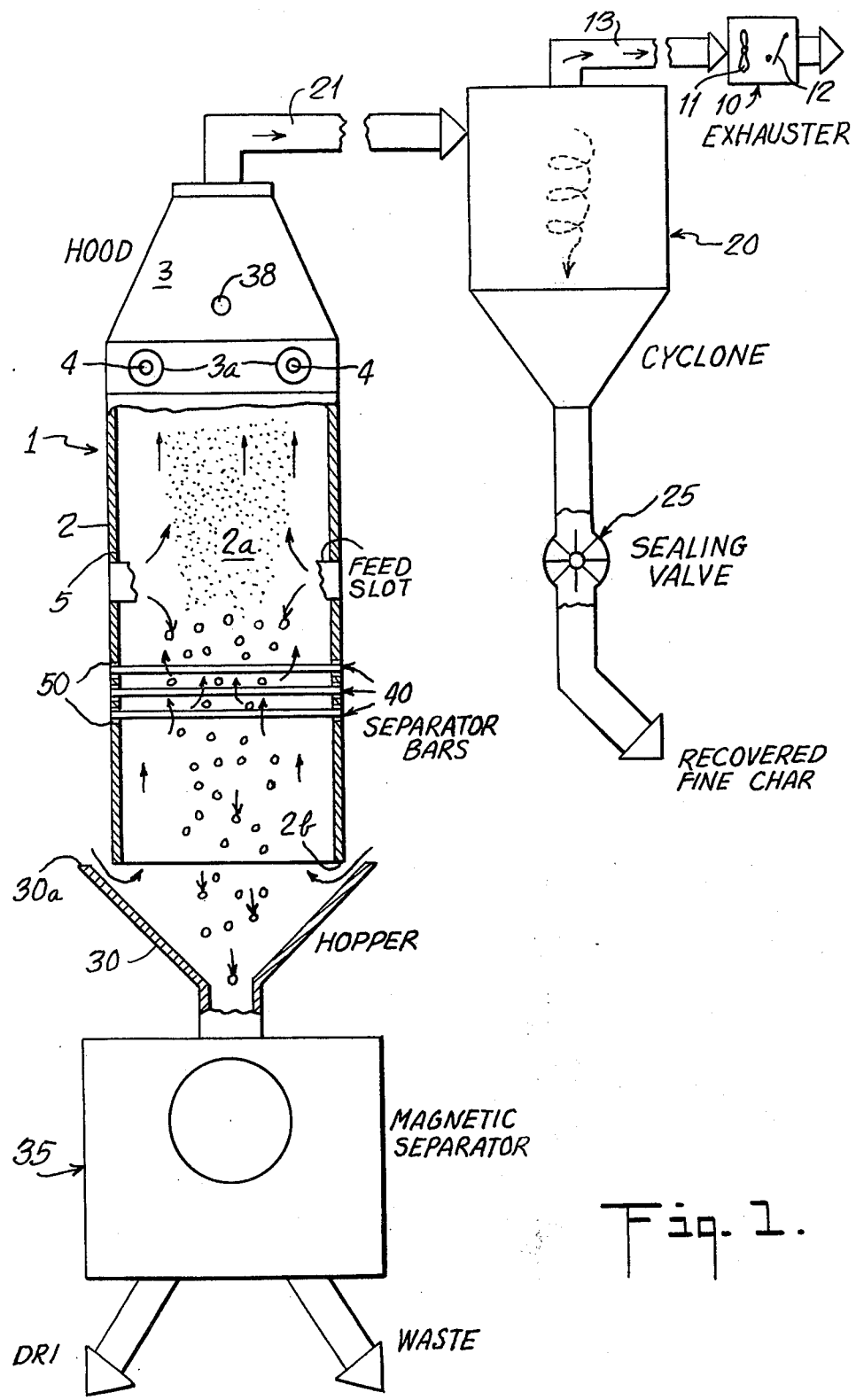
FIG. 1 is a diagrammatic view in elevation of a system including an elutriation device in accordance with the present invention.

A system including an elutriation device or elutriator 1 in accordance with the present invention is shown in FIG. 1 and is particularly useful in separating various types of particles in the comparatively fine portion of the discharge materials resulting from coal fired processes. In many coal fired processes partially burned particles of coal called char are found in the discharge materials and must be separated out, after which they may be recycled to the process or passed to waste. For example, in the process for directly reducing ores and other materials containing iron oxides in a rotary kiln using a solid carbonaceous reducing agent such as coal as both fuel and reductant, the materials discharged from the kiln are screened and subjected to magnetic separation. The sponge iron or DRI product and course char are separated and recovered, while the remaining fine particles are usually passed to waste. These particles may contain char particles, fine ash, fine sponge iron, refractory bits, iron oxides, sulfur control agent, inert waste and the like. The larger char particles separated from the DRI and recovered are recycled into the process. However, in the past a good deal of the fine char has been included in the waste because of its mixture with the other fine particles which would constitute contaminants if returned to the process. Of course, the greater percentage of char that can be recycled the more efficient the process becomes, since less fresh coal need be used in the overall process. The elutriator 1 provides a simple and efficient method and means for separating the fine char from the remainder of the fine waste using an air stream to classify the particles on the basis of their density and aerodynamic properties.

More particularly as seen in FIG. 1, the elutriator 1 comprises a housing which may be in the form of a generally rectangular box-like structure 2 having a hollow interior defining a chamber 2a through which air is drawn upwardly (as indicated by the straight arrows) by means of an exhaust system comprising an exhauster 10, in the form of an exhaust fan 11 and air control valve 12, which is connected by an exhaust line 13 to a collector cyclone 20 that in turn is connected by a pressure line 21 to the top of the elutriator 1. The top of the elutriator comprises a hood 3, to which line 21 is connected, and which is sealingly mounted on the upper end of the box 2. The hood 3 may be provided with ports 3a fitted with bleed dampers 4 which control the admission of air into the upper portion of the chamber 2a.

In the central portion of the box 2 a feed slot 5 is formed to admit the materials to be classified into the chamber 2a. The area of zone of the chamber 2a in this region is where the majority of the separation of the constituents of the materials takes place. The upwardly flowing air stream is drawn into the chamber 2a at its lower open end by passing between the lower peripheral edge 2b of the box 2 forming the chamber 2a, and the upper rectangular peripheral edge 30a of a collecting trough or hopper 30 disposed beneath the chamber 2a. The plan area of the base of the box 2 relative to the area defined by the upper perimeter 30a of the hopper 30 should be such that the velocity of the ingress of air into the chamber 2a will result in the velocity of the air in the central portion or zone of the chamber where separation takes place, not exceeding the separation velocity for the materials introduced through the feed slot 5 into the separation zone. The velocity of the ingress air is preferably one-half the separation velocity, so that the area defined by the upper perimeter 30a of the hopper 30 should be about twice the plan area of the separator box.

Figure 2:
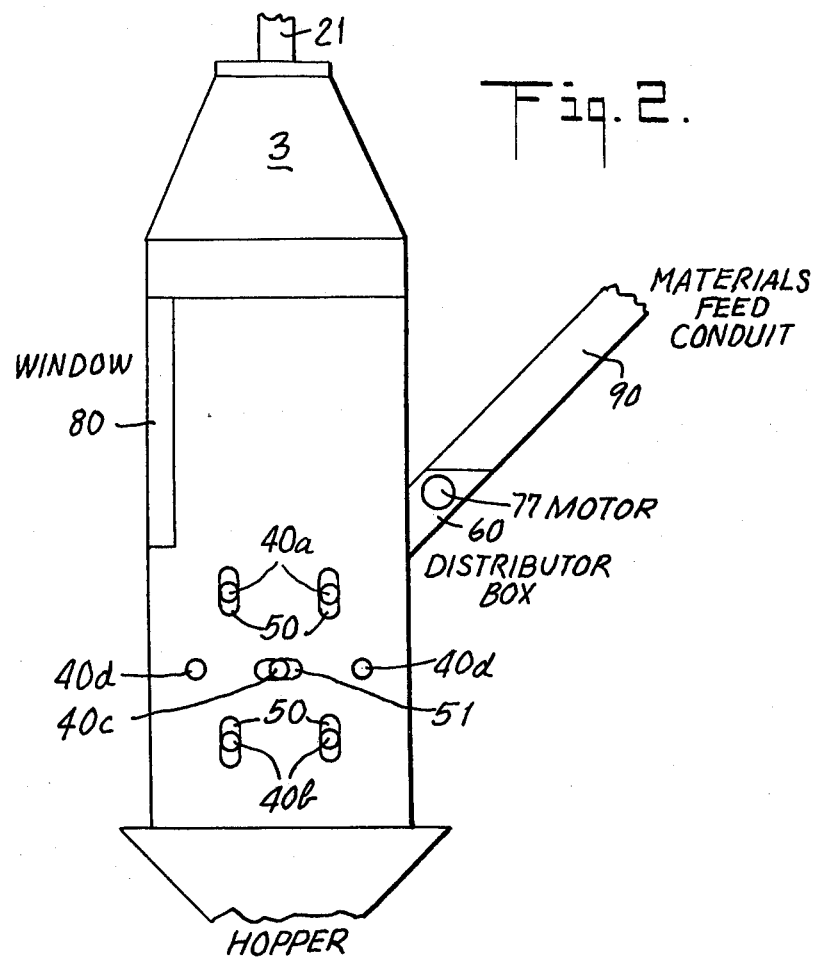
FIG. 2 is a side view in elevation of the device of FIG. 1.

In the region between the separation zone and the open lower end of the separator box 2 a series of separator bars 40 are disposed across the chamber 2a to regulate the separation velocity and turbulence of the passing air. As seen in FIG. 2 slots 50 are formed in the sides of the box 2 so that the upper and lower bars or rods, 40a and 40b, may be displaced upwardly or downwardly. This displacement may be used to obtain the proper separation velocity and turbulence, since the closer the positioning of the bars, the smaller cross-sectional passage between them, and thus the air velocity and turbulence is increased in their vicinity. The central bar 40c may be moved back and forth horizontally in slot 51 between fixed bars 40d to even out the airflow and enhance the separation action on the particles in the separation zone since particle feed occurs from one side through the feed slot 5 which runs the width of one side of the separator box 2.

Figure 3:
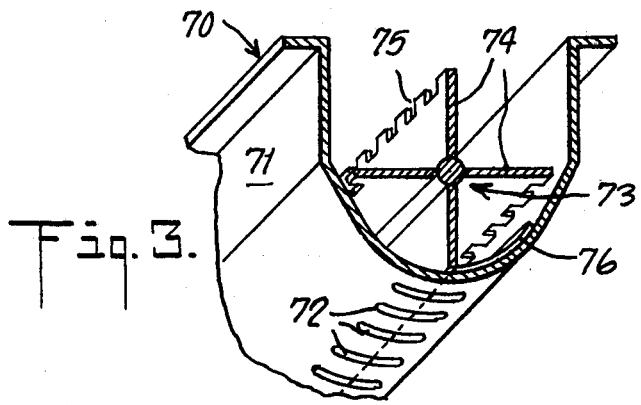
FIG. 3 is a perspective view of the hopper/spreader disposed in the feed slot shown in FIG. 2.

Mounted at the feed slot 5 is a distributor box 60, shown in FIG. 2, into which the fine particles to be separated are fed after being screened and separated out of the main discharge materials from a suitable coal fired process. The distributor box 60 is in the form of a hopper fitted at its bottom with a spreader device 70 shown in detail in FIG. 3. The spreader device 70 may be of a conventional type conprising an elongated trough 71 having a series of apertures 72 in the form of holes or slots in the bottom for passing the particles. Preferably slots are formed in the bottom of the trough within a sector of about 45° with respect to its center of curvature, and the size of their openings is regulated by an adjustable covering piece 76. A distributor vane 73 with its axis lying along the axis of curvature of the bottom of the trough 71 is rotatable therein by means such as a suitable drive motor 77 (FIG. 2). The distributor vane 73 has four arms 74 with bent serrated edges 75 which when the vane 73 is rotated spread and meter the particles fed into the trough 71 through the trough slots 72 for even distribution through the feed slot 5 into the chamber 2a.

The separator box 2 may be fitted with a transparent viewing window 80 to permit observation of the interior condition of the box, and the box may be adapted to permit feeding through slots on both sides. The upper portion of the box above the window 80, as previously noted, is in the form of an exhaust hood 3. Hood 3 may be fitted with ports 3a containing bleed dampers 4 to permit additional air into the chamber 2a to assist in the sweeping of the upwardly flowing airborne particles into the exhaust line 21 connected between the top of the hood 3 and the collector cyclone 20. A suitable gauge 38 for measuring the air pressure within the hood may also be included.

Operation of the elutriator 1 in separating lighter particles from the remaining fine materials discharged, for example from a coal-fired kiln, will now be described. Firstly, the prescreened char along with contaminants, such as fine coal ash, refractory bits, spent limestone and fine DRI in the case of the above-noted direct reduction process, are fed by means of a suitable conduit or chute 90 into the distributor box 60 mounted on the side of the separator box 2. All of the entering particles fall into the spaces between the rotating distributor vane arms 74 and are spread and metered by the vane 73 and drop through the openings in the bottom of the trough 71 in a substantial even distribution into the feed slot 5 of the separator 2.

Upon passing through the feed slot 5 and entering the chamber 2a, the particles are subjected to the countercurrent airflow stream. The less dense or lighter particles will be drawn upward by the air stream, while the heavier or more dense particles will drop within the stream. The aerodynamic resistance of the particles may tend to enter into the separation, but as the surfaces of most of the particles will be fairly similar, specific gravity will essentially control the separation.

It has been found that with a chamber approximately six feet high and one and two feet on the sides, excellent separation can be achieved between fine char particles and fine coal ash, refractory bits, spent limestone, DRI and outer fine particles, using an air stream velocity above the rods 40 of about 13 feet per second. The velocity may be varied, as necessary, between 10 and 18 feet per second by adjustment of the exhauster damper 12, if there is a range of $4\frac{1}{4}$ to $2\frac{1}{8}$ inches verticle separation between the rods which are $1\frac{1}{2}$ inches in diameter. The internal pressure in the chute may be varied in the range from about 0.1 to about 0.3 inches of $H_2O$ negative and is preferably maintained at about 0.2 inches $H_2O$ negative.

The heavier particles drop through the spaces between the bars or rods 40 and fall into the collection hopper 30 disposed beneath the chamber 2a. As previously explained, the area of the hopper defined by its upper perimeter should be about two times the area of the open lower end of the separator box 2. The particles collected in the hopper 30 can then be reclassified by a second stage elutriation device if desired to remove any fine char particles carried along with the heavier particles. When used with the above-noted reduction process, the separated particles which will essentially comprise fine DRI and nonmagnetic fine waste are ultimately fed from the hopper 30 to a magnetic separator 35 that will recover the fine DRI and pass the nonmagnetic particles to waste.

The fine char particles carried upwardly in the air stream are drawn through the hood 3 into the exhaust system. The bleed dampers 4 disposed in ports 3a in the hood may be adjusted to admit additional air to sweep the particles along the conduit 21 to the collector cyclone 20. Cyclone 20 is preferably of low and variable efficiency so that only very fine particles, for example, of less than #22, #32, or #42 mesh Tyler screen, as the case may be, will be passed through the exhauster 10. The exhauster 10 may be mounted in a separation building to effect collection of the particles in a suitable bag house beyond. The char particles are collected in the bottom of cyclone 20 and are discharged from the bottom thereof through a sealing valve 25 and may be recycled to the main process or subjected to another stage of classification in a comparable elutriation device with appropriate adjustments which will be within the purview of those skilled in the art. The exhaust air flow is controlled through the exhauster 10 by the fan 11 in combination with the damper valve 12. Any dust remaining in the exhaust air, as noted, may be removed in a bag house or other suitable device beyond the exhauster.

It has been found that by recovering and recycling fine char separated with the present elutriation device, and particularly by feeding it through the discharge end of the rotary kiln in a direct reduction process, the amount of coal necessary to be fed in time to the overall process may be reduced by as much as 20%.

I claim:

1. An elutriation device comprising:
    chamber means for defining an air flow path;
    means for producing air flow through said chamber means along said path;
    means for admitting a mixture of particulate materials into a zone within said chamber means along said path;
    means disposed across said chamber means for controlling the rate and turbulence of said air flow in said zone to separate the lighter particles from the heavier particles in said mixture, the lighter particles being carried by said flow and the heavier particles falling through it, said controlling means comprising:
        a plurality of rod-like members arranged in three sets, one set being disposed between the other two sets; and
        means for permitting adjustment of the spacing between said other two sets and said one set;
    means disposed beneath said chamber means for receiving said falling heavier particles; and
    means for collecting the separated lighter particles.

2. Apparatus as in claim 1 wherein said one set comprises three rod-like members disposed substantially in a horizontal plane with the center member being adjustably spaced from the two outer members.

3. Apparatus as in claim 1 or claim 2 wherein said other two sets each comprise two rod-like members adjustably spaced from said one set.

4. Apparatus as in claim 1 wherein said chamber means has an open lower end with a cross-sectional area $A_1$ and said means for receiving said falling heavier particles has an open upper end with a cross-sectional area $A_2$, the open lower end of said chamber means and the open upper end of said receiving means being disposed such that areas $A_1$ and $A_2$ lie substantially in the same plane and are related to each other such that $A_1/A_2 \approx 2/1$.

5. Apparatus as in claim 1 wherein said means for admitting the mixture comprises means for defining a substantially horizontal slot in said chamber means.

6. Apparatus as in claim 5 further comprising means for evenly metering the particles in said mixture through said slot.

7. Apparatus as in claim 1 wherein said chamber means defines a substantially vertical path, and said means for producing airflow through said chamber means comprises exhauster means operatively connected to said chamber means for creating a negative air pressure at the upper end of said path.

8. Apparatus as in claim 7 further comprising means at the top of said chamber means above said zone for admitting additional air into said airflow.

9. Apparatus as in claim 7 wherein said means for collecting the separated lighter particles comprises a low-efficiency cyclone operatively connected between said chamber means and said exhauster means.

10. A method for separating fine char particles from the mixture of fine particles found in the discharge materials from a coal-fired direct reduction process comprising the steps of:
    introducing the mixture of particles in a substantially evenly distributed flow into an upwardly flowing air stream;
    adjusting the velocity and turbulence of the air stream in the zone of the air stream into which the particle mixture is introduced such that the lighter char particles are carried upwardly with the air stream, while the other heavier particles in the mixture fall by gravity downwardly through the air stream;
    receiving the downwardly falling heavier particles in a hopper; and
    removing and collecting the lighter char particles from the air stream by means of a low-efficiency cyclone.

11. A method as in claim 10 comprising the further step of returning the collected lighter char particles to said direct reduction process.

* * * * *